Nov. 18, 1969    R. C. PARK ETAL    3,478,430
COMBINED AIR, WATER, AND SPRAY APPARATUS FOR DENTISTRY
Filed Sept. 19, 1966    2 Sheets-Sheet 1

*INVENTOR.*
*JON K. PARK*
*ROBERT CRAIG PARK*
BY *John H. Widdowson*
*Phillip A. Rein*
ATTORNEYS

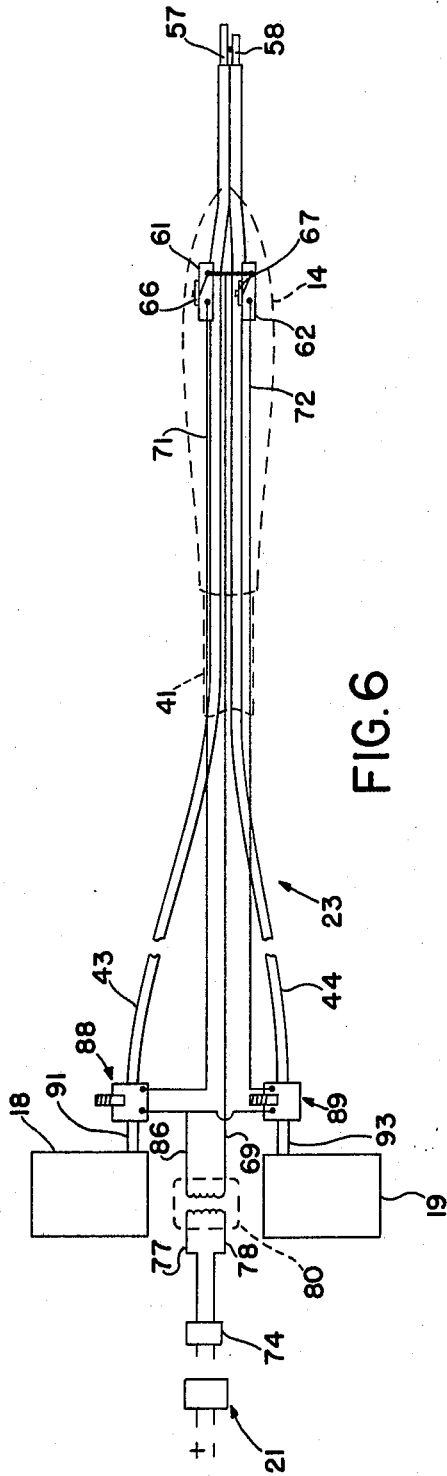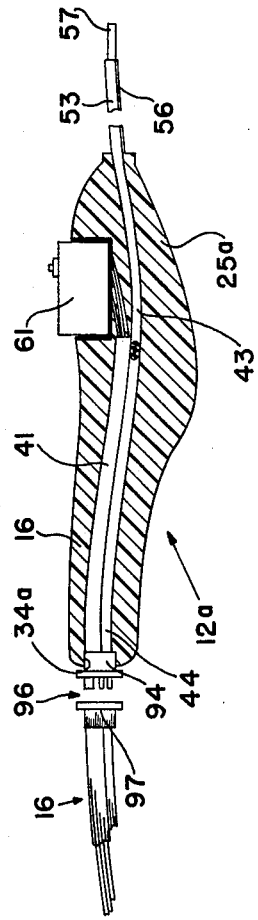

United States Patent Office 3,478,430
Patented Nov. 18, 1969

3,478,430
COMBINED AIR, WATER, AND SPRAY
APPARATUS FOR DENTISTRY
Robert C. Park and Jon K. Park, both of 911 Brown Bldg.,
Wichita, Kans. 67202
Filed Sept. 19, 1966, Ser. No. 580,525
Int. Cl. A61c 17/02
U.S. Cl. 32—28
2 Claims

ABSTRACT OF THE DISCLOSURE

This invention is a dental handpiece to supply fluid to a desired location through the use of switch means to selectively eject air, water, or an air water spray therefrom. More particularly, this invention is an apparatus having a housing; conduit means secured to the housing to supply air, water, and electricity thereto; the conduit means having bendable discharge portions to direct air and water to a desired location; and control means having switch means to selectively regulate the flow of air and water through the discharge portions.

---

Numerous elaborate structures are known to the prior art operable to supply air and water to the working area of a patient by a dentist so as to clear away and clean the same. It is noted, however, that the prior art devices are difficult to manipulate and use requiring the actuation of various controls resulting in a structure that is time-consuming and inconvenient to operate. Additionally, the complicated prior art structures are expensive to manufacture and costly to maintain and service.

In one preferred specific embodiment of the invention, an apparatus for supplying air, water, or an air-water spray is provided for primary usage by dentists; the apparatus having electrical, air, and water supply means connected to a handpiece and control means operable to regulate the discharge of the fluids from the handpiece. The handpiece has a contoured housing with a removable plate member permitting access thereto for repair and maintenance. The supply means consists of separate flexible electrical, air, and water conduits extended through an opening in one end of the housing with the air and water conduits further extended outwardly of the opposite end of the housing through another opening to form discharge sections. A clamp member within the housing anchors the conduits thereto and rubber seals are mounted in the opposed openings of the housing to seal the same. The discharge sections are secured to a common flexible wire member so as to be movable to a desired angular position relative to the handpiece and maintained in this position. The control means has first and second switch members mounted within the housing and connected to the electrical conduit. In turn, the electrical conduit is operably connected to a power source through the first and second switch members to air and water solenoids to control the flow of air and water, respectively, therethrough. The first and second switch members are separately operable to permit the flow of air and water through the air and water conduits, respectively, for exit through the discharge sections as desired. Additionally, the first and second switch members are operable conjointly for an air-water spray mixture discharge from the apparatus. It is seen that the handpiece is readily maneuverable and operable through the control means to discharge air, water, or an air-water spray mixture at the time and in the direction desired.

In another preferred embodiment of the invention, the dental apparatus has a contoured housing of one piece molded construction having the first and second switch members molded therein. The separate electrical, air and water conduits extend through and are molded within the housing with the discharge sections extended from one end thereof and a detachable plug member at the opposite ends thereof. Therefore, the electrical, air, and water conduits are releasably connected to the plug member whereupon the dental apparatus can be easily removed and replaced in case of maintenance problems or if a different variation of the device is desired to be secured thereto.

Accordingly, it is an object of this invention to provide a new and novel air, water, and spray mixture supply apparatus for primary usage in dentistry overcoming the above-mentioned disadvantages of the prior art devices.

Another object of this invention is to provide a fluid supply apparatus for dentistry that is compact, lightweight, and simple to use.

A further object of this invention is to provide a dental handpiece apparatus usable with a minimum of effort and time to discharge water, air, or an air-water spray mixture.

One other object of this invention is to provide a dental handpiece apparatus having a housing; electrical, air, and water conduits extended through the housing; and switch means mounted within the housing to selectively control the discharge of air, water, or an air-water spray mixture therefrom.

Still, one other object of this invention is to provide a dental apparatus for supplying air, water, or an air-water spray mixture that is economical to manufacture, simple in structure, and easy to maintain.

Various other objects, advantages and features of the invention will become apparent to those skilled in the art from the following discussion taken in conjunction with the following drawings, in which:

FIG. 5 is an elevational sectional view of the second embodiment of the fluid supply apparatus of this invention; and FIG. 6 is a schematic diagram illustrating the control means of the fluid supply apparatus of this invention.

Figure 1:
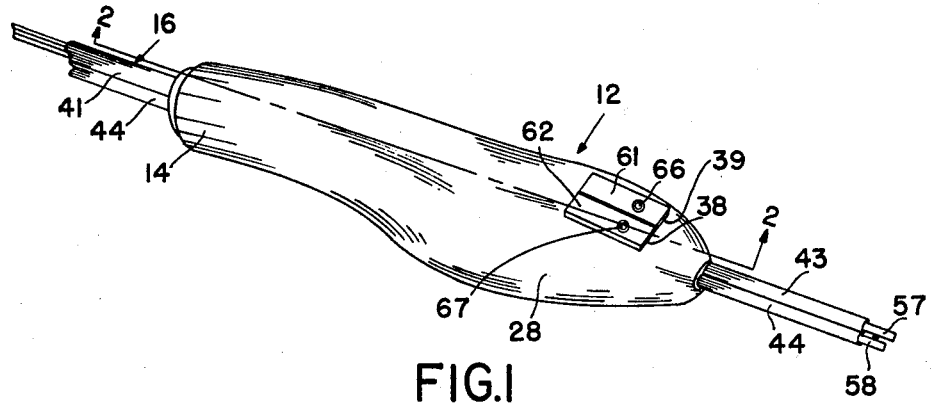
FIG. 1 is a perspective view of the fluid supply apparatus of this invention.

The following is a discussion and description of preferred specific embodiments of the new fluid supply apparatus of this invention, such being made with reference to the drawing, whereupon the same reference numerals are used to indicate the same or similar parts and/or structure. It is to be understood that such discussion and description is not to unduly limit the scope of the invention.

Referring to the drawings in detail and in particular to FIG. 1, the fluid supply apparatus of this invention, indicated generally at 12, includes a handpiece 14 connected by conduit means 16 to air, water and electrical supply sources 18, 19, and 21 (FIG. 6), and actuated by a control means 23 to selectively discharge a preselected fluid therefrom.

The handpiece 14 includes a contoured housing 25 having an enlarged access opening 26 on the underside thereof covered by a plate member 28 secured thereto as by screws 30. The housing 25 has an enlarged central cavity 32 with openings 34 and 35 at opposite ends, respectively, for reasons to be explained. Additionally, a pair of adjacent rectangular openings 38 and 39 are located on the top surface of the housing 25. It is seen that the handpiece 14 is of size and shape so as to comfortably fit within a person's hand to be readily grasped for ease of maneuverability and control.

The elongated conduit means 16 includes an electrical cable 41, an air supply tubular member 43, and a water supply tubular member 44 secured together along substantially the entire length as by a molding process during manufacture. The conduit means 16 is trained through the opening 34 with the air supply tubular member 43 and water supply tubular member 44 further extended through the forward portion of the housing 25 and out the opening 35. The conduit means 16 is anchored within the cavity by a clamp member 46 secured to the housing 25 as by a screw 47. The conduit means 16 is sealed at the opening 34 by a grommet type seal 49 and the air and water tubular supply means 43 and 44 are similarly sealed by a resilient seal 51 in the forward opening 35. The forward outwardly extended portions of the air and water tubular supply means 43 and 44 are formed with discharge sections 53 and 54, respectively, secured to a flexible cable or wire 56. The discharge sections 53 and 54 are further secured to cylindrical open-ended tips 57 and 58, respectively, to direct air and water therefrom. The air tip 57 extends a further distance outwardly of the water tip 58 for reasons to be explained and is jointed to this tip 58 as by solder, welding or the like. The wire 56 adds rigidity to the tubular members 43 and 44 while permitting flexibility so that the tips 57 and 58 can be directed in any angular relationship to the handpiece 14 as desired by the operator and will be retained in this new position by the wire 56.

Figure 2:
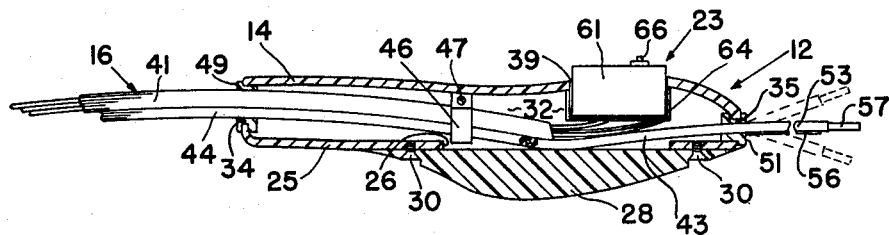
FIG. 2 is an elevational sectional view taken along line 2—2 in FIG. 1.
Figure 3:
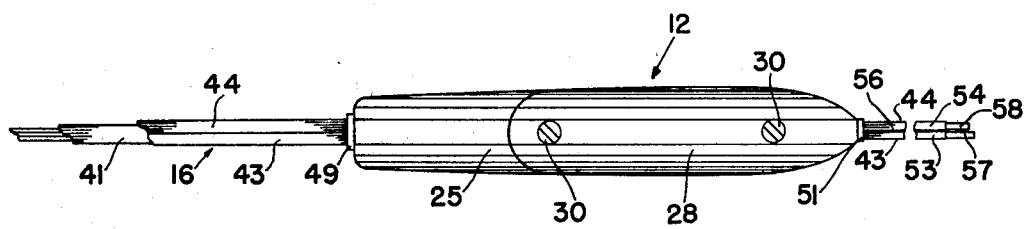
FIG. 3 is a bottom plan view of the fluid supply apparatus of this invention.

As shown in FIG. 2, within the housing 25, the electrical cable 41 is connected to switch members 61 and 62 which form a portion of the control means 23. The switch members 61 and 62 are secured to brackets 64 in the housing 25 and extend upwardly and outwardly of the rectangular openings 39 and 38, respectively. Push button actuators 66 and 67 on top of the switch members 61 and 62, respectively, are operable to close the electrical circuit through an inlet power supply line 69 to outlet lines 71 and 72 from the switch members 61 and 62.

In order to explain the control means 23 in more detail, reference is made to FIG. 6 whereupon a conventional electrical plug 74 is connected to the power source 21 to supply 110 volt AC through conduits 77 and 78 to a transformer 80 for conversion to 24 volt power output of low amperage for safe usage by the operator. This converted voltage is connected to the inlet power supply line 69 of the electrical cable 41 to supply power to the switch members 61 and 62. The other output line 86 from the transformer 80 is connected to an air solenoid 88 and a water solenoid 89 which, in turn, are mounted adjacent the air and water supply sources 18 and 19 in the air supply tubular member 43 and the water supply tubular member 44, respectively. The air supply source 18 is connected by a pipe member 91 to the solenoid 88 and then by the air supply tubular member 43 to the handpiece 14. Similarly, the water supply source 19 is connected by a tube 93 to the solenoid 89 and then to the handpiece 14 by the water supply tubular member 44. The solenoids 88 and 89 are connected to the outlet lines 71 and 72 leading to the output side of the normally opened switch members 61 and 62, respectively. It is obvious that the solenoids 88 and 89 are preferably of a conventional magnetic type that act as electrical valves to control fluid flow into the air and water supply tubular members 43 and 44, respectively, from the given sources.

In the use and operation of the fluid supply apparatus 12 of this invention, the handpiece 14 is held within the operator's hand with the discharge sections 53 and 54 adjusted as desired to direct the tips 57 and 58 in the proper direction for ready placement in the proper position, as for example, in a patient's mouth by a dentist. The control means 16 is supplied with electrical current by the source 21 and on depression of the actuator 66 of the switch member 61, the air solenoid 88 is energized through lines 77, 86, and 71, to open the pipe member 91 to supply air under pressure through the air supply tubular member 43 for discharge through the tip 57. It is obvious that the discharge continues until the push button actuator 66 is released by the operator.

On depression of the push button actuator 67 on the other switch member 62, the water solenoid 89 is actuated through lines 78, 86, and 72 to supply fluid through the tube 93 and the water supply tubular member 44 for discharge through the tip 58. It is obvious that the lightweight handpiece 14 is readily maneuverable whereby the discharge sections 53 and 54 may be easily directed to a desired location by the operator.

If a spray mixture is desired, the push button actuators 66 and 67 are closed simultaneously whereby both air and water are supplied through the air and water supply tubular members 43 and 44, respectively. The water supply tip 58 is shorter than the other tip 57 so that the air acts to pick up and atomize the water into a fine spray or mist with the type desired regulated by the respective water and air pressure used.

It is seen that the fluid supply apparatus 12 of this invention presents a compact, easily-maneuverable handpiece tool usable mainly in dental operations. The application of air, water, or an air-water spray mixture by the apparatus of this invention is simple and immediately controlled by the operator and, therefore, overcomes numerous disadvantages of the prior art devices.

Figure 4:
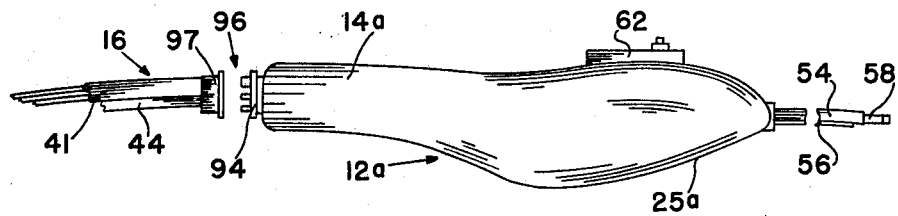
FIG. 4 is a side elevational view of a second embodiment of the fluid supply apparatus of this invention.

In another embodiment of a fluid supply apparatus 12a as shown in FIGS. 4 and 5, a handpiece 14a is provided having a solid contoured housing 25a that is molded in the manufacturing operation into a single unit with the conduit means 16 and switch members 61 and 62 contained therein. The electrical cable 41, the air supply tubular member 43, and the water supply tubular member 44 are similarly molded together and extended through the rearward opening 34a whereupon they are connected to a male connector 94 of a plug means 96 (FIG. 4). A second female type connector 97 is connectible to the first connector 94 whereupon it is seen that the entire handpiece 14a is readily detachable by the use of the plug means 96 so that the handpiece 14a can be easily replaced in case of faulty operation. It is seen, therefore, that this new embodiment of the handpiece 14a presents a readily replaceable fluid supply apparatus 12a having the conventional detachable plug means 96 usable whereby the handpiece 14a can be readily replaced and variations of the apparatus can be used on connection to the cable 41 and air and water supply tubular members 43 and 44. Additionally, the construction of the handpiece 14a in a single molded operation results in a simplified construction with resultant savings in the cost of manufacture so that the handpiece 14a can be readily replaced at a minimum of expense.

It is obvious that the use and operation of the handpiece 14a of the second embodiment of this invention is substantially identical to that previously described for the handpiece 14 and, therefore, further discussion thereof is not deemed necessary.

As will be apparent from the foregoing description of the preferred embodiments, applicant's fluid supply apparatus presents a relatively simple and inexpensive structure that is easily adaptable so as to be readily usable in presently established dental offices. Applicant's construction eliminates a great deal of time-consuming excessive movement involved in the normal operations on a patient in a dental office and the savings thereof results in a considerable monetary savings.

We claim:

1. An apparatus for selectively ejecting air, water or a spray mixture comprising:

(a) a hand piece having a housing,
(b) control means, (c) conduit means having an air supply tubular member and a water supply tubular member secured to one end portion of said housing to supply air, water and electricity thereto and connectable through said control means to air and water sources, respectively, said conduit means having discharge portions extended outwardly of said housing to direct air and water therefrom, said discharge portions secured to a flexible support member whereby said discharge portions are movable to a desired position relative to said hand piece and held by said support member for various dental usages, and (d) said control means having switch means secured to said housing and operably connected to said conduit means, said switch means having an air control switch connected to a solenoid on said air supply tubular member and a water control switch connected to a solenoid on said water supply tubular member and said air and water control switches are positioned adjacent each other in said housing so as to be readily actuated singularly or together by an operator's one finger member and selectively operably to discharge air, water or a spray mixture of air and water through said discharge portions.

2. The apparatus of claim 1 wherein:
(a) said housing is constructed, shaped and adapted to be readily carried within and maneuvered by one's hand, and
(b) the discharge portions of said conduit means are bendable.

References Cited
UNITED STATES PATENTS

| | | | |
|---|---|---|---|
| 3,213,537 | 10/1965 | Balamuth et al. | 32—28 |
| 3,346,958 | 10/1967 | Sinatra et al. | 32—28 |
| 3,375,823 | 4/1968 | Pamplin et al. | 128—173.1 |
| 2,776,487 | 1/1957 | Brown | 32—28 |

ROBERT PESHOCK, Primary Examiner

U.S. Cl. X.R.

128—173.1